(12) United States Patent
Fusaro, Jr. et al.

(10) Patent No.: US 6,963,044 B2
(45) Date of Patent: Nov. 8, 2005

(54) COATING APPARATUS AND PROCESSES FOR FORMING LOW OXIDE COATINGS

(75) Inventors: Robert Anthony Fusaro, Jr., Schenectady, NY (US); Harvey Donald Solomon, Schenectady, NY (US)

(73) Assignee: General Electric Compnay, Schenectady, NY (US)

(*) Notice: Subject to any disclaimer, the term of this patent is extended or adjusted under 35 U.S.C. 154(b) by 71 days.

(21) Appl. No.: 10/682,228

(22) Filed: Oct. 8, 2003

(65) Prior Publication Data

US 2005/0077272 A1 Apr. 14, 2005

(51) Int. Cl.$^7$ ............................................. B23K 10/00
(52) U.S. Cl. ........................... 219/121.46; 219/121.47; 219/137.41; 219/76.16
(58) Field of Search ..................... 219/121.46, 76.16, 219/137.41, 121.47, 121.45, 121.59, 61.12, 74, 137.42; 239/69, 587.1; 118/326, 308

(56) References Cited

U.S. PATENT DOCUMENTS

| | | | |
|---|---|---|---|
| 3,514,567 A | * | 5/1970 | Strang .......................... 219/75 |
| 4,496,823 A | * | 1/1985 | Mann .................... 219/137.41 |
| 4,739,146 A | | 4/1988 | Lindland et al. |
| 4,878,953 A | * | 11/1989 | Saltzman et al. ........... 148/512 |
| 5,569,075 A | | 10/1996 | Leturmy |
| 5,620,523 A | | 4/1997 | Maeda et al. |
| 5,690,844 A | | 11/1997 | White et al. |
| 5,719,369 A | | 2/1998 | White et al. |
| 5,734,143 A | | 3/1998 | Kawase et al. |
| 5,852,272 A | | 12/1998 | Amano |
| 5,961,856 A | | 10/1999 | Fusaro, Jr. et al. |
| 6,084,196 A | * | 7/2000 | Flowers et al. ........ 219/121.46 |
| 6,084,197 A | | 7/2000 | Fusaro, Jr. |
| 6,265,689 B1 | | 7/2001 | Fusaro, Jr. |
| 6,390,383 B1 | | 5/2002 | Fusaro, Jr. et al. |
| 2003/0107160 A1 | | 6/2003 | Bowlin et al. |

FOREIGN PATENT DOCUMENTS

| | | | | |
|---|---|---|---|---|
| EP | 0 350 486 B1 | | 3/1993 | |
| EP | 1127958 A | | 8/2001 | |
| JP | 56144865 A | * | 11/1981 | ............ B23K/9/04 |
| JP | 57 032373 | | 2/1982 | |
| JP | 05 023861 | | 2/1993 | |
| JP | 2001/172758 | | 6/2001 | |

OTHER PUBLICATIONS

European Search Report for European Patent Application No. 04 25 6254.

* cited by examiner

Primary Examiner—Quang T. Van
(74) Attorney, Agent, or Firm—Cantor Colburn LLP

(57) ABSTRACT

A local environmental cell for a welding spray gun includes an annular ring having a top surface and a bottom surface, wherein the annular ring is adapted for attachment to an outer perimeter of the spray gun; and a plurality of fluid passageways radially disposed about the annular ring having a plurality of openings in the bottom surface of the ring in fluid communication with a vacuum source for providing a vacuum thereto. The use of the local environmental cell permits deposition of local bond coats as well as minimizes the number of steps associated with welding repair processes. For example, the use of the local environmental cell permits welding and formation of a low oxide bond coat during the welding process, thereby eliminating the need for placing the substrate subsequent to a welding process in a separate spray cell to deposit the bond coating.

14 Claims, 4 Drawing Sheets

COATING APPARATUS AND PROCESSES FOR FORMING LOW OXIDE COATINGS

BACKGROUND

The present disclosure is generally related to welding and plasma spray processes and apparatuses such as may be desirable for fabrication, restoration or repair of metal articles. More particularly, the present disclosure relates to a welding process and an apparatus for producing low oxide bond coatings as well as a method for providing a bond coat during a welding process.

Many types of metals are used in industrial applications. When the application involves demanding operating conditions, specialty metals are often required. As an example, components within gas turbine engines operate in a high-temperature environment. Many of these components are formed from nickel-base and cobalt-base superalloys. Since the components must withstand in-service temperatures in the range of about 1,100° C. to about 1,150° C., the superalloys are often coated with thermal barrier coating (TBC) systems. These coating systems usually include an underlying bond coat applied directly to the superalloy substrate, and a ceramic-based overcoat applied over the bond coat. For a jet engine, the coatings are applied to various superalloy surfaces, such as turbine blades and vanes, combustor liners, and combustor nozzles.

As with other gas turbine engine parts, gas turbine engine operators find it desirable to repair thermal barrier coated parts periodically to restore them to desirable conditions. Generally, if the part is repairable, it is routed through a repair cycle that includes numerous operations. The repair cycle may include operations such as weld repairs to fill cracks and/or restore tip dimensions, braze repairs to fill cracks and/or restore or change a vane's class, tip repairs to restore abrasive tips, and other steps. The repair cycle also includes reapplication of the bond coat as well as the thermal barrier coating. Accordingly, the repair process generally includes a variety or processing steps requiring different equipment sets. For example, welding may be performed to repair the substrate using various welding equipment and processes specific to welding. The welding may be followed by application of the bond coat, which generally requires transfer of the part to be repaired to a spray cell. As such two separate operations are required for effecting a weld repair and a plasma spray coat application such as the bond coat.

The effectiveness of a TBC system is often measured by the number of thermal cycles it can withstand before it delaminates from the substrate that it is protecting. In general, coating effectiveness decreases as the exposure temperature is increased. The failure of a TBC is often attributed to weaknesses or defects related in some way to the bond coat, e.g., the microstructure of the bond coat or deficiencies at the bond coat-substrate interface or the bond coat-TBC interface. Thus, carefully controlling the properties of the bond coat is important for adequate and prolonged protection to the substrate.

One problem with current processes is that the bond coatings tend to suffer oxidation during normal thermal spraying in air. The products of oxidation are usually included in the coating and the resulting bond coating is usually harder and more wear resistant. However, the presence of oxides in the coatings detrimentally affect corrosion, strength and machinability. Although various processes such as HVOF have been developed to improve other properties of the coating such as density and porosity among others, these processes are relatively expensive and by their very nature introduce oxygen into its plasma feedstream, thereby providing an inherent mechanism for oxide formation during coating. Moreover, as previously discussed, the use of a separate controlled spray cell is typically required for placement of the part during spray coating.

BRIEF SUMMARY

Disclosed herein is a local environmental cell for a welding spray gun. The local environmental cell comprising an annular ring having a top surface and a bottom surface, wherein the annular ring is adapted for attachment to an outer perimeter of the spray gun; and a plurality of fluid passageways radially disposed about the annular ring comprising a plurality of openings in the bottom surface of the ring in fluid communication with a vacuum source for providing a vacuum thereto.

Also disclosed herein is a welding gun and a local environmental cell combination, the combination comprising a welding gun including a permanent electrode disposed within a housing, wherein the housing includes fluid passageways for passage of an inert gas; and a local environmental cell attached to an outer perimeter of the welding gun, the local environmental cell comprising an annular ring circumscribing the welding gun housing and having a top surface and a bottom surface, wherein the annular ring further comprises a plurality of fluid passageways radially disposed about the annular ring having a plurality of openings in the bottom surface of the ring in fluid communication with a vacuum source for providing a vacuum thereto.

A process for welding a substrate and forming a low oxide bond coat during the welding process, the process comprising circumferentially maintaining an inert atmosphere about an area of the substrate to be welded, wherein maintaining the inert atmosphere comprises circumferentially vacuuming about the plasma arc with a local environmental cell; welding the substrate and forming a molten pool in the area of the substrate, wherein the molten pool has a trailing edge and a leading edge; and selectively depositing a powder at the trailing edge as the molten pool is solidifying or prior to solidifying in an amount effective to form a bond coat layer on the substrate.

In accordance with another embodiment, a process for forming a low oxide coating comprises forming a plasma arc atop a workpiece; circumferentially vacuuming an area about the plasma arc with a local environmental cell, wherein the local environmental cell comprises an annular ring engaged with an outer perimeter of a plasma spray gun for forming the plasma arc, the annular ring comprising a plurality of fluid passageways having openings positioned above the substrate so as to vacuum particulates, non-reacted powder, ozone, and fumes from the substrate; and delivering a powder in a carrier gas to the workpiece to produce the low oxide coating.

The above described and other features are exemplified by the following detailed description and drawings.

BRIEF DESCRIPTION OF THE DRAWINGS

Referring now to the figures wherein like elements are numbered alike.

DETAILED DESCRIPTION

Figure 1:
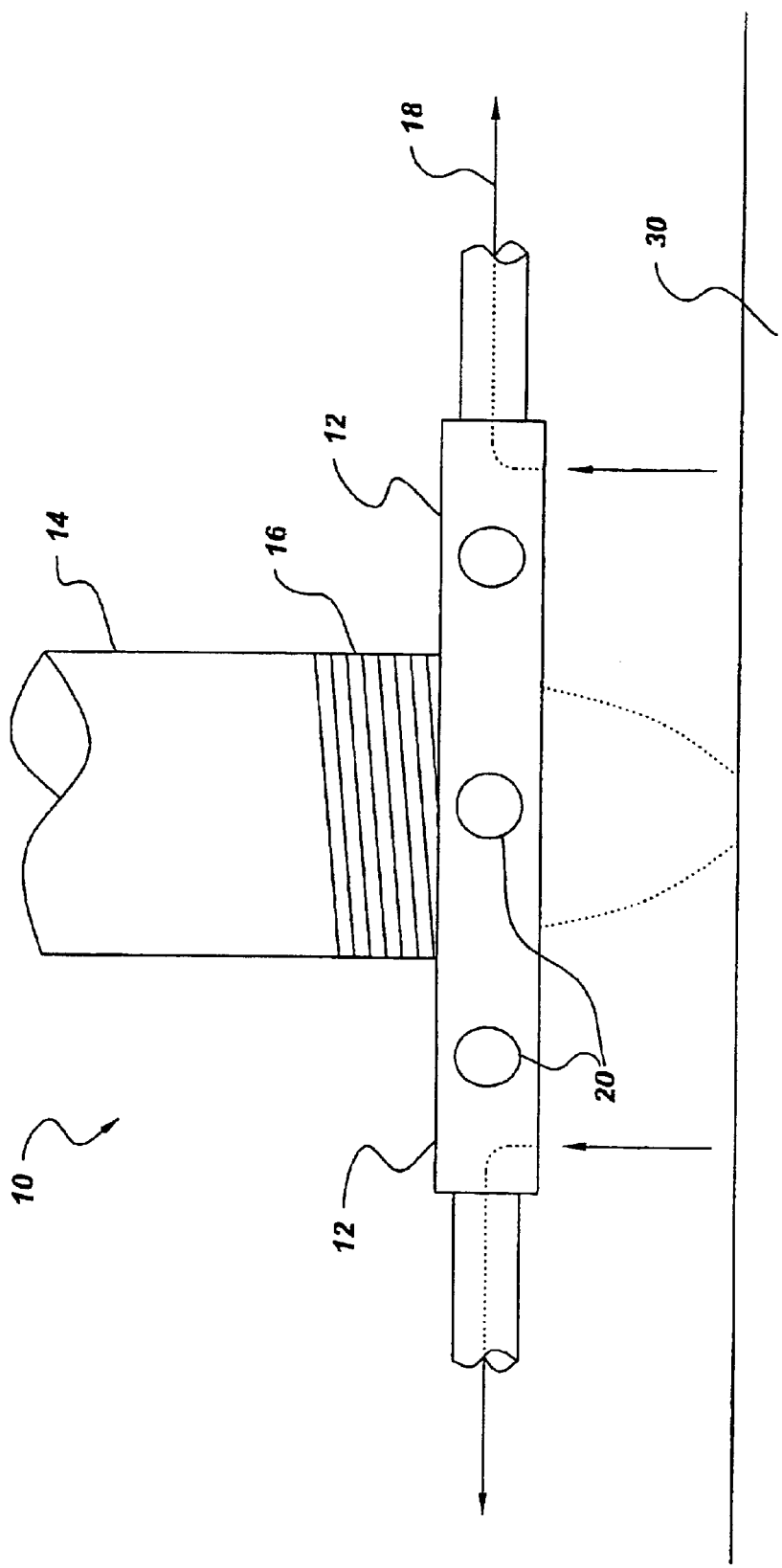
FIG. 1 is a partial perspective view of a local environmental cell and a plasma spray gun.
Figure 2:
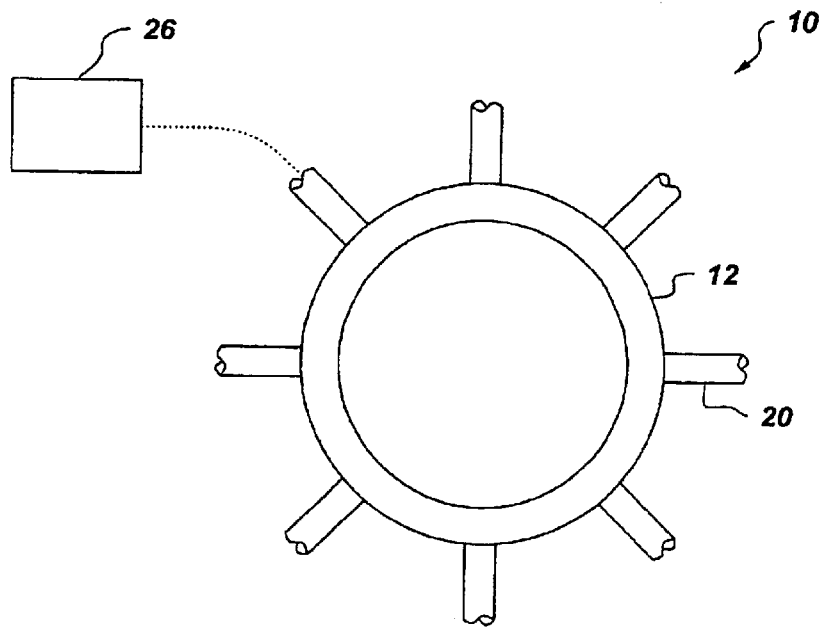
FIG. 2 is a top plan view of the local environmental cell of FIG. 1.
Figure 3:
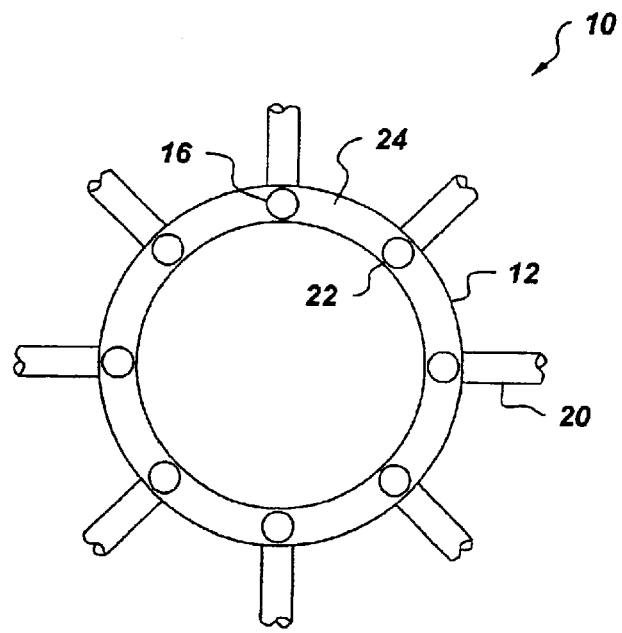
FIG. 3 is bottom plan view of the local environmental cell of FIG. 1.

Referring now to FIGS. 1–3, there is shown a local environmental cell generally designated 10 for performing a welding operation such as a plasma transferred arc (PTA) or a gas tungsten arc (GTA) welding process in a controlled atmosphere. Welding processes such as the PTA and GTA welding processes generally flow an inert gas such as argon, helium and the like about a permanent tungsten electrode as is known in the art. The inert gas protects the electrode and generally shields the weld pool formed by exposing the substrate to the plasma. Advantageously and as will be discussed herein, the local environmental cell 10 eliminates the need for a separate spray cell for controlling the atmosphere about the welding spray gun and as such, increases the versatility of the welding operation. The local environmental cell circumferentially provides a uniform vacuum about the weld pool to remove contaminants from the substrate and provide an exhaust mechanism for ozone, non-reacted powders, fumes, and the like.

The local environmental cell 10 generally includes an annular shaped ring 12. An inner diameter of the annular ring 12 is preferably threaded and sized to receive an outer diameter of a welding spray gun 14, which has a complementary threaded exterior surface 16 for threadingly engaging the annular ring 12 to the spray gun 14. A plurality of fluid passageways as indicated by arrow 18 is defined in the annular ring 12. As shown, the plurality of fluid passageways 18 comprises eight tubes 20 radially attached to an outer perimeter of the annular ring 12 and is in fluid communication with inlet openings 22 disposed in a bottom surface 24 of the ring. The fluid passageways 18 are preferably uniformly spaced about the annular ring 12 to provide uniform and controlled vacuuming. Although eight passageways are shown, more or less can be employed depending on the desired configuration and application. Moreover, the number of inlet openings 22 disposed in the bottom surface 24 and in fluid communication with the tubes 20 can be increased or decreased depending on the desired application.

The ring 12 may optionally include an annular passageway (not shown) within the ring in which each fluid passageway 18 is fluidly connected therewith or alternatively, as shown, each fluid passageway 18 represents a separate passageway. A vacuum source 26 is fluidly connected with the passageways 18 to provide a vacuum thereto. In this manner, during operation of the local environmental cell 10 in connection with a welding operation, such as a PTA welding operation, continuous removal of ozone, particulate matter, fumes, powder, and the like can advantageously be made during welding. Because the local environmental cell 10 is attached directly to the welding spray gun 20 and the vacuum openings are in close proximity to the weld pool, or substrate 30 to be coated by the plasma, the necessity of a separate spray cell employed for controlling the environment about various prior art spray applications is no longer required since the local environmental cell provides a containment center about the plasma arc and the welding pool. The use of the cell 10 in this manner allows the end user the opportunity to include local plasma spraying as part of the weld repair process, for example, thereby offering significant commercial advantages. More importantly, low oxide bond coatings can be formed using the spray gun in combination with the local environmental cell 10. These advantages will be discussed in greater detail below.

Figure 4:
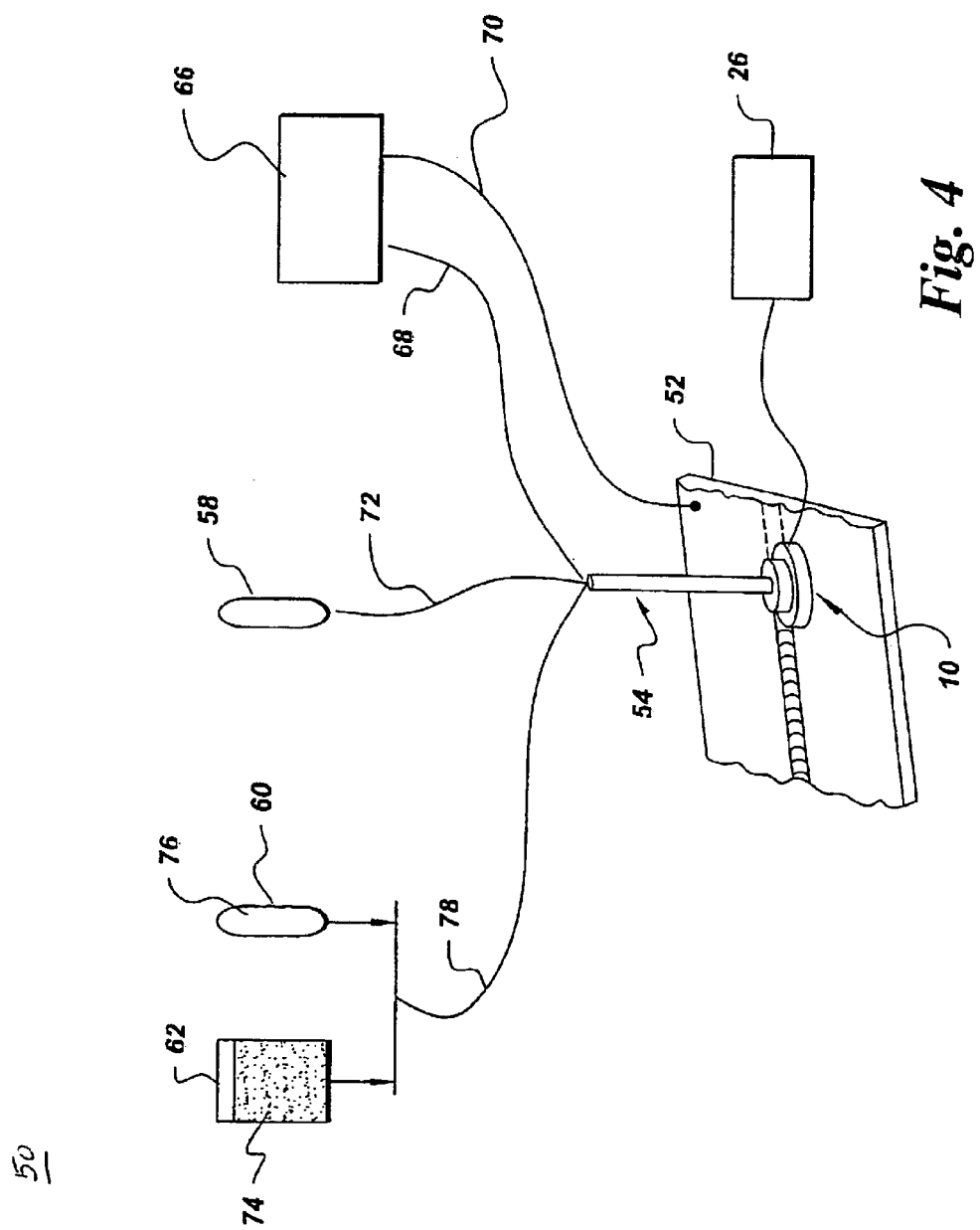
FIG. 4 is a schematic of a plasma transferred arc torch system.
Figure 5:
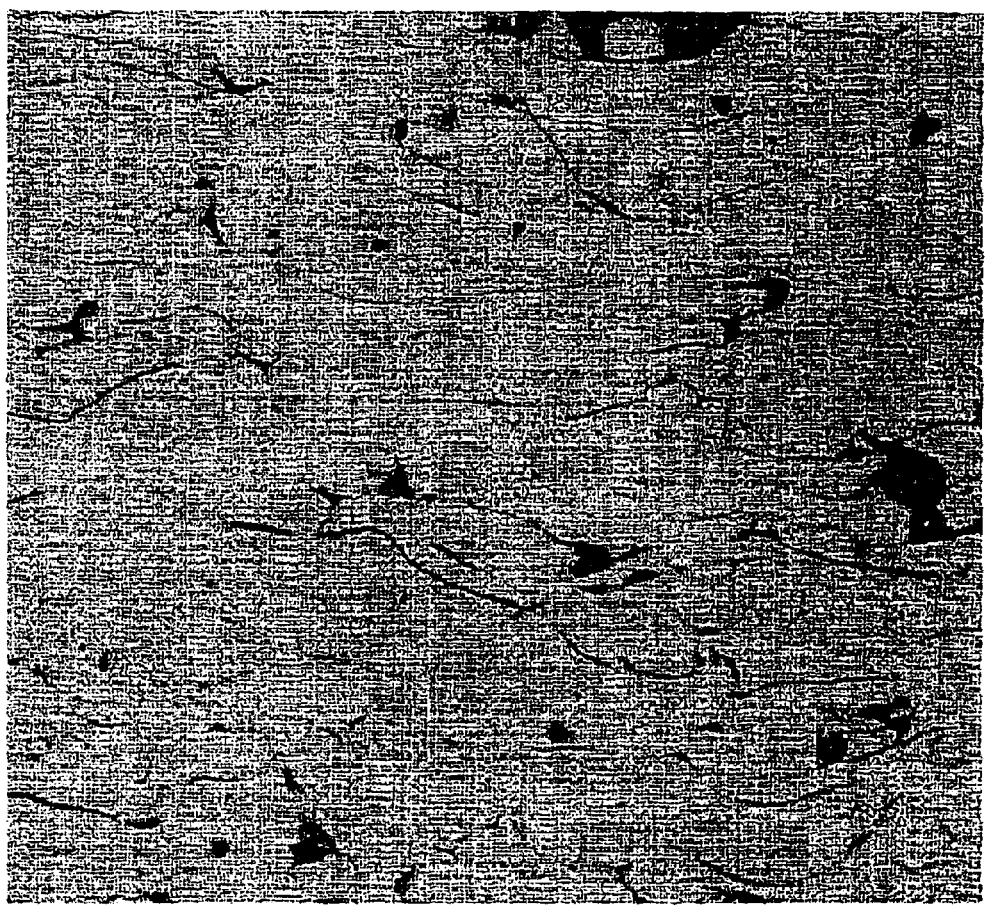
FIG. 5 is a micrograph of a bond coat produced in accordance with the present disclosure exhibiting an oxide level of 10 percent.

Referring now to FIG. 4, there is shown an exemplary plasma transferred arc (PTA) torch system 50 suitable for welding a metallic workpiece 52. The system 50 generally includes a plasma transferred arc torch 54, gas supplies 58, 60, a powder feed supply or hopper 62. The torch 54 includes a power supply 66 having one electrical lead 68 joined to the torch 54, and a second electrical lead 70 joined to the workpiece 52 for providing an electrical ground. Gas supply 58 is joined in fluid communication with the torch 54 using conduit 72 for supplying shielding and/or plasma gases, such as argon or a combination of argon and helium, or the like, to the torch 54 for use in developing plasma and providing a suitable shielding gas thereabout the welding pool and plasma arc. The local environmental cell 10 is shown disposed about an outer perimeter of torch 54 and is in fluid communication with vacuum source 26.

The plasma gas is generally fed to an annular chamber of the torch 54 in a known manner, surrounding and insulating the electrode tip so as to form a pilot arc. Shielding gas is generally fed to the lower portion of the torch and distributed according to an annular path so as to substantially protect the weld pool generated during welding operations against any external chemical contaminants such as oxygen. The use of the local environment cell further supplements protection against external contaminants as well as removes fumes, ozone, excess powder and the like from the substrate. Gas supply 60 provides the carrier gas, preferably argon or nitrogen gas, to the hopper 62 for conveying the powders into the torch 54.

The powder hopper 62 is in fluid communication with torch 54 and receives powder 74 from the powder hopper 62 and a carrier gas 76, such as argon or nitrogen, from gas supply 60 via fluid conduit 78. The carrier gas 76 is provided under controlled flow rate for carrying the powder 74 to the torch 54. The powder is generally in the form of metallic filler particulates, and for bond coat applications, can comprises Ni, Cr, Co, Bo, Fe, W, and WC, the particular selection of which depends on the desired application.

A tubular exclusion fender or skirt typically may surround the spray gun nozzle for containing the shielding gas in the standoff volume and displacing the oxygen therefrom. In this case, the local environmental cell 10 is attached to the skirt. The shielding gas provides a temporary exclusion zone in which the plasma arc 76 is maintained and receives the injected powder for welding or cladding the workpiece 12. Although the skirt can provide a reduced oxide level in the coating, in combination with the local environmental cell 10, the presence of oxygen within the plasma environment is substantially eliminated, thereby providing the capability of depositing low oxide bond coatings as well as preventing the incorporation of oxidized powder into the bond coat. Consequently, the oxide level in the bond coating will be advantageously reduced and the density advantageously increased.

To form a coating such as the bond coat, a plasma arc is established by ionizing the argon gas passing through an electric arc formed between a permanent tungsten electrode (−) and the work piece. This arc is commonly referred to as the "transferred arc". The transferred arc is constrained by the plasma nozzle resulting in a "plasma column" with temperatures between about 10,000° C. and about 15,000° C. The energy released by the arc is proportional to the amount of current applied to the arc and the arc length.

Powdered metal is fed at a controlled rate into and/or around the plasma stream through injection ports and is subsequently heated by the arc to a molten state. The molten material is deposited onto the substrate The relationship between plasma energy and powder feed rate determines the amount of "arc energy" remaining to melt the work piece. As a result, extremely good control over the depth of penetration into the work piece is achieved. Shielding gas is delivered through the large outer nozzle, protecting a substantial area around the plasma from oxidation. An elaborate cooling system is typically employed to maintain plasma torch temperatures at sustainable levels in a manner generally known by those skilled in the art.

As previously discussed, the local environmental cell 10 in combination with welding spray guns provides a further reduction in oxide levels for applications requiring the deposition of a bond coat, topcoat or the like. The general purpose of the bond coat is to provide improved adhesion of a subsequent thermal barrier coating onto a metallic substrate. The bond coat, for example, MCrAlY wherein M is Fe, Ni, Co, or a mixture of Ni and Co, or another metal or alloy such as hafnium and silicon or a diffusion aluminide, is applied to a superalloy substrate portion of the component, usually a nickel based or cobalt based superalloy substrate, as the first layer. The bond coat can provide oxidation and corrosion protection as well as being a mechanical bonding surface for the top coat. An example of a top coat is a thermal barrier coating that protects the metal against the action of a hot gas flow common to gas turbines.

The thickness of the bond coat will depend on various factors, such as the oxidation protection and corrosion protection desired for the component, as well as material costs. The shape and size of the part may also be considered, since the thickness of the bond layer should not exceed dimensional tolerances. A weight limit for the part may be an additional factor for consideration (especially in the case of an airfoil), since the bond coat will add some weight to the component. In general, the thickness will be in the range of about 50 microns to about 500 microns, and preferably, in the range of about 100 microns to about 400 microns. In especially preferred embodiments, the thickness will be in the range of about 200 microns to about 300 microns.

In one embodiment, a bond coat is simultaneously deposited during a welding process. The process generally comprises forming a welding pool in the substrate using the local environmental cell 10 in combination with a welding gun as previously described. The welding pool is in a molten state having a leading edge and a trailing edge. Powder suitable for forming a bond coat is selectively deposited at the trailing edge, wherein the molten pool is cooler than the leading edge. The powder is deposited immediately prior to solidification or simultaneously with solidification of the trailing edge. In this manner, the powder does not completely dissolve in the molten pool but forms a rough discrete bond coat layer exhibiting high tensile strength. The resulting bond coat is suitable for thermally spraying a TBC thereto. The local environmental cell 10 reduces the oxide content of the bond coating in the manner discussed above, thereby providing a dense bond coating. Advantageously, depositing the bond coat layer during welding reduces the cycle time by eliminating a separate stand alone process normally employed by thermally spraying the bond coat layer after the welding process.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A local environmental cell for a welding spray gun, comprising:
   an annular ring having a top surface and a bottom surface, wherein the annular ring is adapted for attachment to an outer perimeter of the spray gun; and
   a plurality of fluid passageways radically disposed about the annular ring comprising a plurality of openings in the bottom surface of the ring in fluid communication with a vacuum source for providing a vacuum thereto.

2. The local environmental cell of claim 1, wherein the plurality of fluid passageways comprises a plurality of tubes having one end in fluid communication with an annular passageway contained in the annular ring and an other end in fluid communication with the vacuum, wherein each one of the tubes is uniformly spaced apart about a perimeter of the annular ring.

3. The local environmental cell of claim 1, wherein the plurality of fluid passageways comprises a plurality of tubes having one end in fluid communication with at least one passageway extending through the annular ring to the opening in the bottom surface and the other end in fluid communication with the vacuum.

4. The local environmental cell of claim 1, wherein the spray gun is a plasma transferred arc torch.

5. In combination, a welding gun and a local environmental cell, the combination comprising:
   a welding gun including a permanent electrode disposed within a housing, wherein the housing includes fluid passageways for passage of an inert gas; and
   a local environmental cell attached to an outer perimeter of the welding gun, the local environmental cell comprising an annular ring circumscribing the welding gun housing and having a top surface and a bottom surface, wherein the annular ring further comprises a plurality of fluid passageways radially disposed about the annular ring having a plurality of openings in the bottom surface of the ring in fluid communication with a vacuum source for providing a vacuum thereto.

6. The combination of claim 5, wherein the welding gun is a plasma transferred arc torch.

7. The combination of claim 5, wherein the outer perimeter of the housing is threaded and the inner perimeter of the annular ring has complementary threads.

8. The combination of claim 5, wherein the plurality of fluid passageways of the local environmental cell comprises a plurality of tubes having one end in fluid communication with an annular passageway contained in the annular ring and an other end in fluid communication with the vacuum, wherein each on, of the tubes is uniformly spaced apart about a perimeter of the annular ring.

9. The combination of claim 5, wherein the plurality of fluid passageways of the local environmental cell comprises a plurality of tubes having one end in fluid communication with at least one passageway extending through the annular ring to the opening in the bottom surface and the other end in fluid communication with the vacuum.

10. A process for forming a low oxide bond coating, comprising forming a plasma arc atop a substrate;

circumferentially vacuuming an area about the plasma arc with a local environmental cell, wherein the local environmental cell comprises an annular ring engaged with an outer perimeter of a plasma spray gun for forming the plasma arc, the annular ring comprising a plurality of fluid passageways having openings positioned above the substrate so as to vacuum particulates, non-reacted powder, ozone, and fumes from the substrate; and delivering a powder in a carrier gas to the workpiece to produce the bond coating.

11. The process according to claim 10, wherein forming the plasma arc atop the substrate comprises forming the plasma arc between an electrode in a plasma transfer arc nozzle and the substrate, and flowing an inert gas through the arc.

12. The process according to claim 10, wherein the carrier gas comprises argon, helium, nitrogen, and combinations thereof.

13. The process according to claim 10, wherein delivering the powder to produce the bond coating comprises depositing MCrAlY, wherein M is selected from the group consisting of Fe, Ni, Co, and a mixture of Ni and Co.

14. The process according to claim 10, wherein delivering the powder to produce the bond coating comprises depositing a diffusion aluminide.

* * * * *